G. F. BRANDON.
CAR COUPLING, UNCOUPLING DEVICE.
APPLICATION FILED APR. 30, 1909.
946,592.
Patented Jan. 18, 1910.
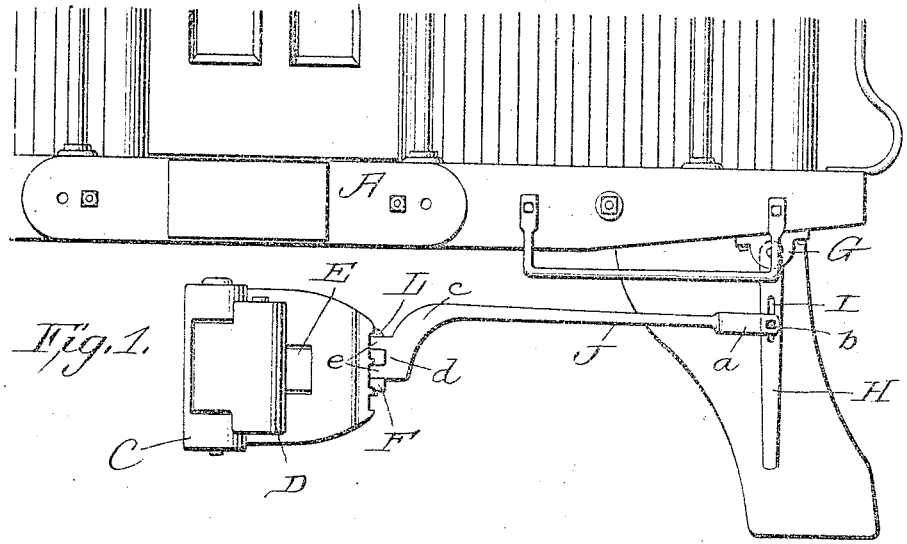
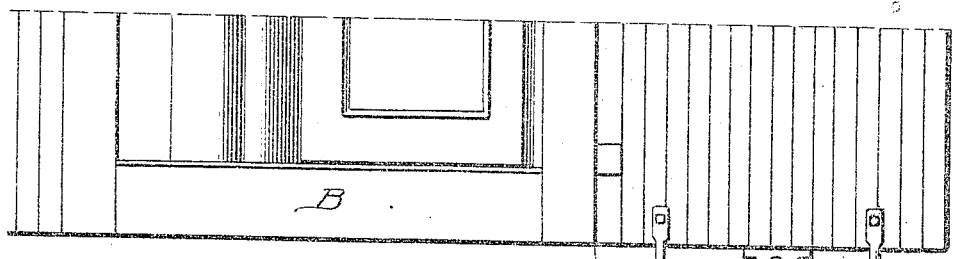
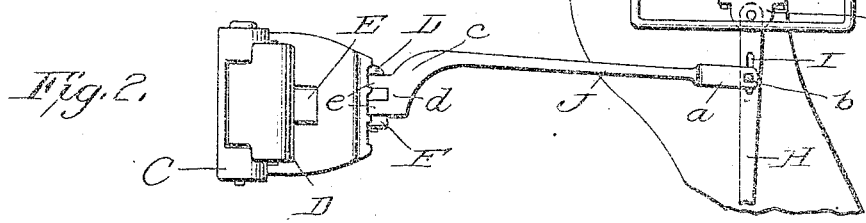
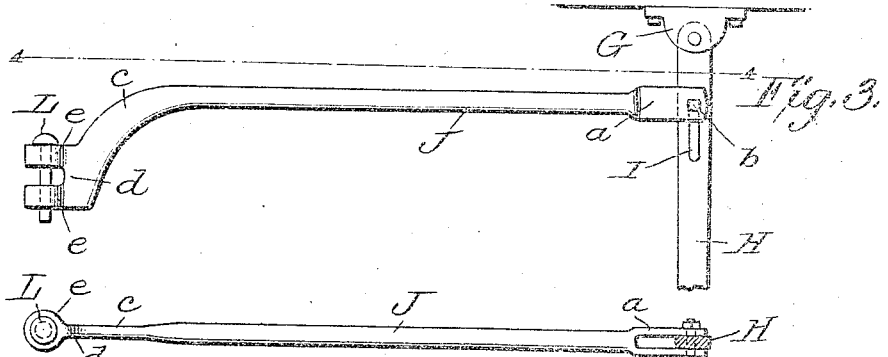
Witnesses
Oliver W. Holmes
J. J. Sheehy Jr.
Inventor
G. F. Brandon
By James J. Sheehy
Attorneys

UNITED STATES PATENT OFFICE.

GUSTAVE FRANK BRANDON, OF MUSKEGON, MICHIGAN.

CAR-COUPLING, UNCOUPLING DEVICE.

946,592.  Specification of Letters Patent.  Patented Jan. 18, 1910.

Application filed April 30, 1909. Serial No. 493,104.

*To all whom it may concern:*

Be it known that I, GUSTAVE FRANK BRANDON, citizen of the United States, residing at Muskegon, in the county of Muskegon and State of Michigan, have invented new and useful Improvements in Car-Couplers, Uncoupling Devices, of which the following is a specification.

My invention has to do with means for manipulating a car coupler so as to enable the same to separate or draw away from a complementary coupler.

The general object of the invention is to provide simple, reliable and advantageously-arranged coupler-manipulating means, designed for use on the long modern passenger coaches, and in combination with a modern coupler having a knuckle and a knuckle lock, and adapted to freely accommodate itself to the considerable lateral swing of the coupler necessary to avoid casual uncoupling when two coupled cars of the long passenger type pass through a curve.

My invention also contemplates the arrangement of the hand lever comprised in my improvements, adjacent the ground and one side of the car, this in order that the same trainman who operates the said lever to release the coupler knuckle can conveniently signal the engineer and bring about the prompt separation of the cars.

With the foregoing in view, the invention will be fully understood from the following description and claim when the same are read in connection with the drawings, accompanying and forming part of this specification, in which:

Figure 1 is a detail end elevation of an open-platform passenger car equipped with my novel coupler manipulating means. Fig. 2 is a corresponding view of a vestibule passenger coach having a similar equipment. Fig. 3 is an elevation of my improvements, removed. Fig. 4 is a horizontal section, taken in the plane indicated by the line 4—4 of Fig. 3, looking downwardly.

Referring by letter to the said drawings: A in Fig. 1 is an open platform passenger car equipped with my improved coupler manipulating means, and B in Fig. 2 is a vestibule passenger car similarly equipped.

C in Figs. 1 and 2 is a coupler head. D is the knuckle in said head, and E is the knuckle lock having the apertured portion F disposed at one side of the head. These elements are all of the ordinary, well known construction, and the coupler head is connected with the car in the conventional manner—*i. e.*, in such manner that the coupler head has considerable lateral play in order to prevent casual disconnection of said head from the coupler head on an adjacent passenger car incidental to the passage of the two long passenger cars through a sharp curve.

In the present and best practical embodiment of my invention that I have as yet devised, my novel coupler manipulating means comprises a depending bracket G fixedly connected to the car body, a hand lever H pivoted to and pendent from the bracket, and having a vertical, longitudinally-disposed slot I at an intermediate point of its length, and a connecting rod J, interposed between and connected with the lock portion F and the lever H. The said rod J is bifurcated at its outer end, as indicated by *a*, to straddle the lever H, and is connected to the said lever through the medium of a bolt *b* which extends through and is adapted to play vertically in the slot I. At its opposite or inner end the rod J is provided with a depending portion *c* which terminates in a bifurcated head *d*, the upper and lower portions *e* of which are apertured and are preferably shaped as shown in Fig. 4. The said apertured portions *e* are adapted to be registered with the apertured portion F of the knuckle lock E, and a bolt L is dropped through the said portions F and E to effect safe and strong connection of the rod J to the knuckle lock E.

In the practical use of my improvements it will be manifest that when the coupler head C swings laterally in accommodating itself to curves and other characteristics of the railway, the lever H and the rod J will freely move with the coupler head and will in no way tend to accidentally unlock and release the knuckle D. It will also be manifest that the capacity of the lever H to swing transversely of the car body, and the capacity of the bolt *b* to play freely in the slot I of lever H, preclude my novel manipulating means from interfering in any measure with up and down play of the coupler head C.

It will further be manifest that the lever H is arranged adjacent one side of the car and near the ground, and that therefore a person standing at one side of the car and on the ground is enabled to conveniently move the lever H and unlock the knuckle D, and is also enabled to conveniently signal the engineer of the train and in that way bring about a prompt separation of the cars.

I would also have it understood that because of the leverage afforded by my novel means, the unlocking of the knuckle may be accomplished with the expenditure of but little effort.

The practical advantages following from the arrangement of my novel means, relative to a car body and the coupler, will be appreciated when it is remembered that where the knuckle unlocking means are accessible only to persons on the platforms of cars, one trainman must effect the unlocking and another trainman signal the engineer to apprise him of the unlocking of the knuckle; also, that when the manipulating means is carried by the platform of a vestibule car, a trainman on the ground cannot gain access to the platform to actuate the manipulating means. Again it will be noted that when a train is in motion, manipulating means on a car platform is accessible to and may be surreptitiously actuated by mischievous persons, while the hand lever H of my novel means cannot be operated except when the train is at rest, and then only by a person standing upon the ground.

As will be readily gathered from the foregoing my improvements are not only simple and inexpensive in construction, but are also advantageous because of the facility with which the same may be applied to passenger cars at present in use.

The specific construction herein illustrated and described constitutes the best practical embodiment of my invention of which I am cognizant, but it is obvious that in the future practice of the invention such changes or modifications may be made as do not involve departure from the spirit of my invention as defined by the claim appended.

Having described my invention, what I claim and desire to secure by Letters-Patent, is:

In a passenger car, the combination of the car body, a coupler head carried by and movable with respect to said body and having a knuckle and a knuckle-lock on which latter is an apertured portion disposed at one side of the head, a lever connected with and pendent from the body of the car, in position to swing freely in the direction of the width thereof, and having a vertical, longitudinally-disposed slot, a connecting rod having a portion at its outer end arranged alongside the slotted portion of the lever and also having a depending portion at its inner end and a vertical aperture in said portion registered with the said apertured portion of the knuckle-lock, a connecting pin extending through the outer portion of the connecting rod and the slot of the lever and movable vertically in said slot, and a vertical bolt extending through and pivotally connecting the inner depending portion of the connecting rod and the apertured portion of the knuckle-lock.

In testimony whereof I have hereunto set my hand in presence of two subscribing witnesses.

GUSTAVE FRANK BRANDON

Witnesses:
BENJ. H. TELLMAN,
HOWARD BRANDON.